Sept. 29, 1964     T. WILHARM     3,150,581
MANUAL AND AUTOMATIC STRUCTURE FOR SETTING
THE DIAPHRAGM OF A CAMERA Filed Feb. 21, 1961     2 Sheets-Sheet 1

INVENTOR

Sept. 29, 1964   T. WILHARM   3,150,581
MANUAL AND AUTOMATIC STRUCTURE FOR SETTING
THE DIAPHRAGM OF A CAMERA
Filed Feb. 21, 1961   2 Sheets-Sheet 2

INVENTOR

United States Patent Office 3,150,581
Patented Sept. 29, 1964

3,150,581
MANUAL AND AUTOMATIC STRUCTURE FOR SETTING THE DIAPHRAGM OF A CAMERA
Theo Wilharm, Stuttgart, Germany, assignor to Eugen Bauer G.m.b.H., Stuttgart-Unterturkheim, Germany
Filed Feb. 21, 1961, Ser. No. 90,840
Claims priority, application Germany, Feb. 23, 1960, B 56,776
14 Claims. (Cl. 95—64)

The present invention relates to cameras.

More particularly, the present invention relates to that type of camera which has a diaphragm which is capable of being automatically set or which is capable of being manually set.

One of the objects of the present invention is to provide a camera of this type with a manually operable means which can set any desired size of exposure aperture without necessarily being retained by the operator in a position where the manually operable means is coupled to the diaphragm-setting structure. In other words, in accordance with the present invention there is provided a structural means which will retain the manually operable means in a position where it can be manipulated to provide any desired exposure aperture while remaining coupled to the diaphragm-setting structure.

Another object of the present invention is to provide a structure of this type which is exceedingly simple and compact.

A further object of the present invention is to provide a structure of the above type which is capable of indicating to the operator, while the operator views the subject which is being photographed, the setting of the diaphragm irrespective of whether the diaphragm is automatically or manually set.

It is also an object of the present invention to provide a structure of the above type which will indicate to the operator when the manually operable means is coupled to the structure for setting the diaphragm.

With the above objects in view the invention includes, in a camera, a support means and a rotary means turnably carried by the support means for adjusting the exposure aperture size. An automatic means cooperates with the rotary means for automatically turning the same to set the exposure aperture to a size determined by the lighting conditions. A manually operable means is carried by the support means coaxially with the rotary means for axial movement toward and away from the latter. A coupling means cooperates with the manually operable means and with the rotary means for coupling the manually operable means and the rotary means to each other when the manually operable means is displaced axially toward the rotary means. According to the present invention there is provided a releasable retaining means which retains the manually operable means in the position where it is coupled to the rotary means irrespective of the aperture size provided by manipulation of the manually operable means, so that the latter may be actuated to provide aperture sizes throughout the entire range of settings possible for the diaphragm of the camera while retained coupled to the rotary means.

The novel features which are considered as characteristic for th einvention are set forth in particular in the appended claims. The invention itself, however, both as to its construction and its method of operation together with additional objects and advantages thereof, will be best understood from the following description of specific embodiments when read in connection with the accompanying drawings, in which:

Figure 1:
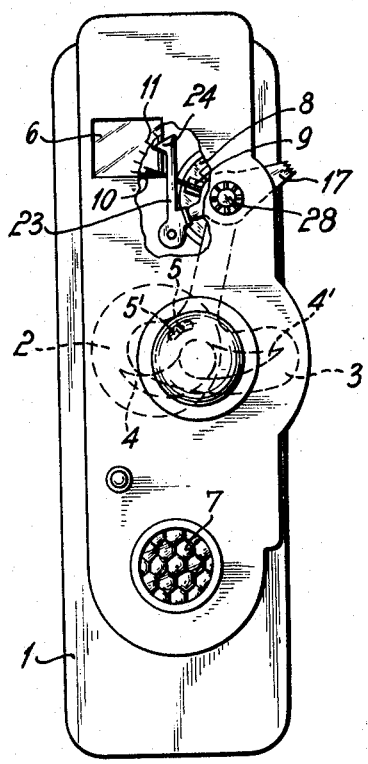
FIG. 1 is a front elevation, partly broken away, of a motion picture camera provided with the structure of the invention.

Referring to FIG. 1, it will be seen that the camera 1 illustrated therein includes a diaphragm composed of the pair of diaphragm blades 2 and 3 respectively formed with the drop-shaped cutouts 4 and 4' so that the size of the exposure aperture will be determined by the extent to which the blades 2 and 3 overlap each other, as is well known. The blades 2 and 3 are interconnected by a pin-and-slot connection 5, 5' and the blade 2 is supported for turning movement in a well known manner in such a way that when the blade 3 swings in a manner described below the blade 2 will turn in a direction opposite to the blade 3 for adjusting the size of the exposure aperture.

The camera 1 carries a viewfinder means which includes the viewfinder window 6 at the front wall of the camera which is visible in FIG. 1. An electrical instrument 8 which may be, for example, a galvanometer, is located in the camera adjacent to the viewfinder window 6 and the instrument 8 includes the rotor 9 which turns to angular positions determined by the lighting conditions. The camera carries, for example, a photocell 7 which is electrically connected with the instrument 8 in a well known manner for producing rotary movement of the rotor 9 in response to changes in the intensity of the light reaching the photocell 7. The blade 3 has an arm which is fixed to the rotor 9 for turning movement therewith so that the upper portion of the blade 3, shown in FIG. 2, forms a rotary means which turns so as to change the size of the exposure aperture. The electrical instrument 8 forms by way of its rotor 9, which is connected to the upper portion of the blade 3, an automatic means for automatically turning the rotary means formed by the upper portion of the blade 3 so as to set the exposure aperture according to the lighting conditions. The rotor 9 additionally fixedly carries a pointer 10 having a free end which overlaps the viewfinder window 6 and the window 6 is provided with a scale 11 cooperating with a pointer 10 for indicating to the operator, while the operator views the subject, the size of the exposure aperture. The end portion of the pointer 10 which is distant from the scale 11 has substantially a U-shaped configuration, as shown most clearly in FIG. 3, and the free extremity of this end portion fixedly carries a knife edge 13 in the form of a relatively short bar of substantially triangular cross section, for example. This knife edge 13 together with the free end portion 12 of the pointer 10 form part of a coupling means. It will be noted that the knife edge 13 is directed away from the rotor 9.

The front wall of the camera housing is formed with a bore through which a portion of a sleeve 14 slidably extends, this sleeve being coaxial with the rotor 9. The camera has in its interior a stationary wall formed with a bore or opening coaxial with the front wall opening through which the sleeve 14 passes and also coaxial with the rotor 9, and a rear end portion of the sleeve 14 is slidably supported by this intermediate wall, as is apparent from FIG. 3, so that these walls support the sleeve 14 for axial shifting movement. The sleeve 14 has intermediate its ends between the front and intermediate walls of the camera a flange 15 which is formed with three equidistant cutouts 16. The intermediate camera wall fixedly carries a pin 14' located in an axial slot formed in the sleeve 14, so that in this way the camera is provided with a support means which supports the sleeve 14 for axial movement but prevents the sleeve 14 from turning.

Figure 2:
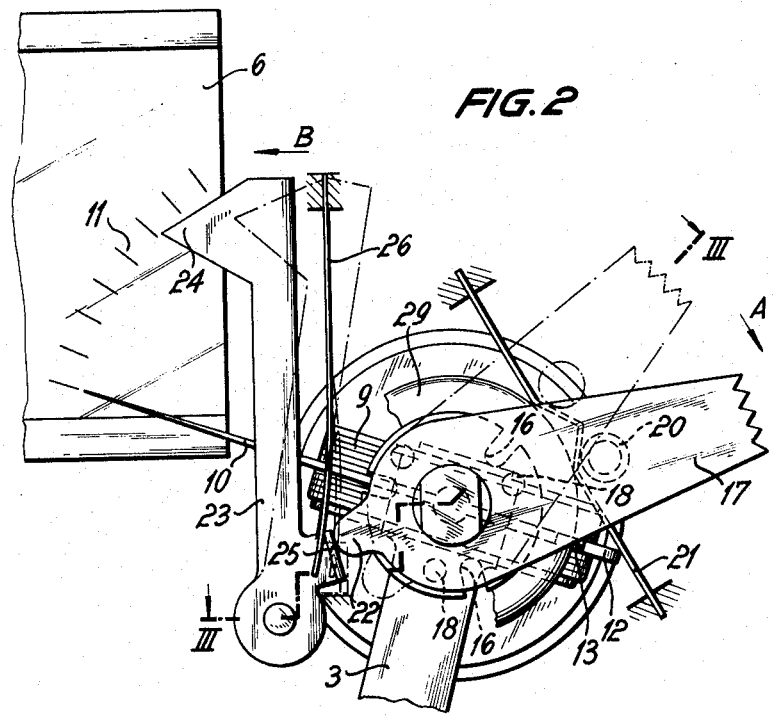
FIG. 2 shows part of the structure of FIG. 1 on an enlarged scale.

A lever 17 is formed with an opening through which the portion of the sleeve 14 at the front side of its flange 15 passes so that the lever 17 is freely turnable with respect to the sleeve 14, and this lever 17 extends through a suitable opening in the camera housing to the exterior thereof so that the outer free end of the lever 17 is accessible to the operator, and this lever 17 may be turned between the solid and the dot-dash line positions indicated in FIG. 2. This lever 17 forms part of a releasable retaining means which serves to releasably retain the sleeve 14 in a position displaced rearwardly from the position indicated in FIG. 3. This releasable retaining means includes in addition to the lever 17 three projections 18 which may, for example, be formed integrally with the lever 17 and which are respectively located in the cutouts 16 in the position of the parts indicated in FIG. 3. A spring means is provided for urging the sleeve 14 toward the front wall of the camera, and the spring means includes the coil spring 19 which is coiled about the sleeve 14 between the intermediate camera wall and the flange 15 in the manner shown in FIG. 3. A holding means is provided for holding the lever 17 in either of the positions indicated in FIG. 2, and this holding means is in the form of a spring 21 cooperating with a roller 20 supported for free rotary movement by the lever 17. The spring 21 is formed intermediate its ends with a substantially V-shaped portion, and the result is that during turning of the lever 17 between its positions shown in FIG. 2 the roller 20 will ride over the crest of the V-shaped portion of the spring 21 so that this spring 21 will yieldably hold the lever 17 either in the position shown in solid lines in FIG. 2 or in the position shown in dot-dash lines in FIG. 2. Thus, this spring 21 acts as over-center spring. The lever 17 also carries at a diametrically opposed part of the portion thereof which extends to the exterior of the camera a projection 22 for a purpose described below, this projection 22 being shown most clearly in FIG. 2.

The sleeve 14 forms part of a manually operable means which is capable of being releasably retained by the lever 17 in a position where the manually operable means is coupled with the rotor 9 for turning the latter and thus manually setting the diaphragm, and the manually operable means is releasably retained in its coupled position when the lever 17 has the solid line position indicated in FIG. 2 where the projections 18 are out of the cutouts 16. An indicator means is provided for indicating when the manually operable means is in its coupled position, and this indicator means includes the lever 23 which is turnably carried by the front wall of the camera housing and which is provided with a pointed portion 24 which overlaps the window 6 so as to be visible in the viewing field of the viewfinder means when the lever 17 has the solid-line position indicated in FIG. 2 retaining the manually operable means in its position coupled with the rotary means for turning the latter to set the diaphragm manually. The indicator lever 23 has distant from its pointer portion 24 a lug 25 which is engaged by the projection 22 of the lever 17 so that when the latter is turned from the dot-dash line position shown in FIG. 2 to the solid line position shown in FIG. 2 the projection 22 will act on the lug 25 to turn the lever 23 from the dot-dash line position shown in FIG. 2 to the solid line position shown in FIG. 2 where the pointer portion 24 of the lever 23 is visible in viewing field of the viewfinder means. A leaf spring 26 is fixed at one end to a stationary part of the camera and has a lower free end engaging the lug 25 at the side thereof opposed to the projection 22, so that this spring 26 urges the lever 23 to turn in a clockwise direction, as viewed in FIG. 2, and thus urges the lug 25 toward and into engagement with the projection 22. A stop member is carried by the camera to engage the lug 25 when the lever 23 is in the dot-dash line position indicated in FIG. 2, so as to limit the turning of the lever 23 in a clockwise direction, as viewed in FIG. 2, and it will be noted that when the lever 17 is turned to the dot-dash line position indicated in FIG. 2, this position being the particular position shown in FIG. 3, the projection 22 is spaced from the lug 25.

The manually operable means referred to above includes in addition to the sleeve 14 a shaft 27 which is located within and which is freely turnable with respect to the sleeve 14. At its front end the shaft 27 fixedly carries a knob 28 located at the exterior of the camera and forming a manually engageable means adapted to be engaged by the operator for moving the shaft 27 and the sleeve 14 therewith inwardly toward the rear of the camera, as indicated by the arrow in FIG. 3, and it will be noted that the knob 28 engages the front end of the sleeve 14 so that when the knob 28 is shifted in direction of the arrow shown in FIG. 3 the shaft 27 and the sleeve 14 will be displaced as a unit in opposition to the spring 19 toward the rotary means formed by the portion of the blade 3 which is fixed to the rotor 9.

As was pointed out above, the portion 12 of the pointer 10 and the knife edge 13 form part of a coupling means for coupling the manually operable means 14, 27 to the rotary means formed by the upper portion of the blade 3, and this coupling means includes in addition the disc 29 which is fixed to the end of the shaft which is directed toward the rotor 9. It will be noted that the disc 29 is not only fixed to the shaft 27, in addition it engages the rear end of the sleeve 14, so that the disc 29, in addition to forming part of the coupling means, also cooperates with the knob 28 to prevent the shaft 27 from shifting axially with respect to the sleeve 14, and thus the shaft 27 can only turn with respect to the sleeve 14, this sleeve 14 moving at all times axially with the shaft 27. The disc 29 has an outer periphery which extends toward the rotor 9 and this outer periphery is formed with teeth which are adapted to cooperate with the knife edge 13. Thus, when the operator depresses the knob 28 inwardly toward the rear of the camera, the manually operable means 14, 27, 28 will be shifted axially toward the rotor 9, and the result will be that the toothed periphery of the disc 29 will engage knife edge 13 so that the coupling means 12, 13, 29 now couples the manually operable means 14, 27, 28 to the rotary means formed by the upper portion of the blade 3, so that when this manually operable means is turned, resulting in rotary movement of the shaft 27 and the knob 28 the coupling means will transmit this rotary movement to the upper portion of the blade 3 as well as the rotor 9, and thus the diaphragm will be manually set, and the position of the pointer 10 with respect to the scale 11 will indicate to the operator the manual setting of the diaphragm. The gaps between the teeth at the periphery of the disc 29 of the coupling means have a configuration which conforms to that of the knife edge 13. Moreover, the shaft 27 has a relatively snug sliding fit within the sleeve 14, so that the shaft 27 engages the inner surface of the sleeve 14 with sufficient friction to retain the shaft 27 in whichever angular position it is turned to with respect to the sleeve 14, while at the same enabling the operator to turn the shaft 27 without any difficulty.

Figure 3:
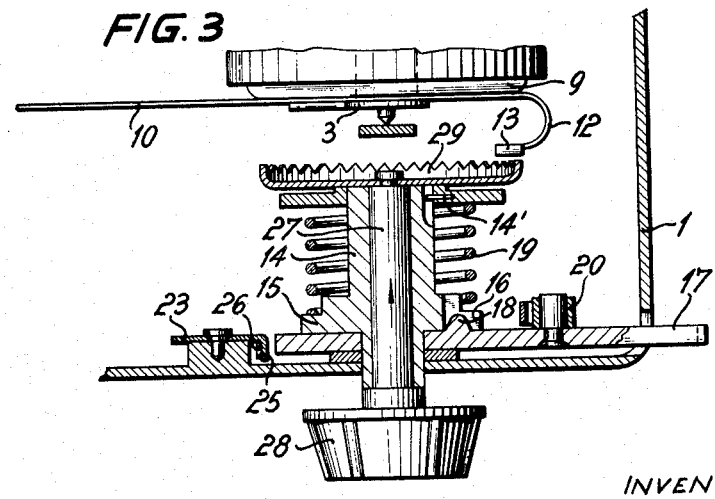
FIG. 3 is a sectional view taken along line III—III of FIG. 2 in the direction of the arrows.

With the parts in the position shown in FIG. 3, the spring 19 has displaced the sleeve 14 to its rest position adjacent the front wall of the camera where the disc 29 is out of engagement with the knife edge 13, so that at this time the manually operable means is uncoupled from the rotary means and the automatic means 8, 9 will now set the diaphragm according to the lighting conditions. The lever 17 is now in the dot-dash line position shown in FIG. 2, as was mentioned above.

In the event that it is desired to manually set the diaphragm and only retain the diaphragm in its manually set position momentarily, then the operator need only press the knob 28 in the direction of the arrow shown in FIG. 3 so that the teeth of the disc 29 will engage the knife edge 13, and now the manually operable means is coupled to the rotary means formed by the upper part of the blade 3, and now while being held in, the operator turns the knob 28 so as to manually set the diaphragm. Of course, the diaphragm will remain in its manually set position at this time only as long as the operator maintains the knob 28 pushed in toward the front wall of the camera in opposition to the spring 19. When this manual setting is no longer desired, the operator simply releases the knob 28 and the spring 19 returns the parts to position shown in FIG. 3 so that the automatic means will again act to automatically set the size of the exposure aperture.

However, if the operator wishes to maintain the manual setting of the diaphragm over a considerable period of time or even to provide different manual settings, which is to say to operate the camera manually with respect to the setting of the diaphragm thereof, the operator will turn the releasable retaining means 17, 18 from the dot-dash line position shown in FIG. 2 to the solid line position shown in FIG. 2, and this will result in movement of the projections 18 out of the cutouts 16 so that the sleeve 14 will be advanced toward the rotor 9 in opposition to the spring 19. The projections 18 are in the form of smoothly curved bulging portions of the lever 17 which have a configuration which enables them to slide easily out of the cutouts 16 while displacing the sleeve 14 rearwardly in opposition to the spring 19. Of course, this turning of the lever 17 will also result in movement of the knob 28 and the shaft 27 rearwardly with the sleeve 14 and thus the teeth of the disc 29 will now engage the knife edge 13 so that the coupling means now couples the manually operable means to the rotary means while the releasable retaining means 17, 18 retains the manually operable means in the position where it is coupled to the rotary means which can now be manually turned for setting the diaphragm. It will be noted that during the manual turning of the shaft 27 the angular position of the flange 15 remains unchanged with respect to the projections 18 so that the operator can turn the shaft 27 to whatever angular position is desired throughout the entire range of settings of the diaphragm while the manually operable means is retained in its position coupled with the rotary means which sets the diaphragm. This is in sharp contrast with a construction where, for example, the sleeve 14 itself would turn so that after a relatively slight turning movement the cutouts 16 would become aligned with the projections 18 and the sleeve 14 would no longer be retained in its position coupling the manually operable means to the rotary means. Thus, through the provision of a separate sleeve 14 which is not axially movable with respect to the shaft 27 while providing free turning of the latter, it is possible to retain the manually operable means in its position coupled with the rotary means while at the same time providing for free turning movement of the shaft 27 through all angular positions. In other words the retaining means 17, 18 will retain the manually operable means 14, 27, 28 in its position coupled with the rotary means formed by the upper portion of the blade 3 irrespective of the angular position of the shaft 27.

Of course, as long as the manually operable means is coupled to the rotary means the portion 24 of the indicator lever 23 will be visible in the viewing field and the operator will know that the diaphragm must be manually set, and at this time the pointer 10 cooperates with the scale 11 to indicate setting of the diaphragm in the same way as when the diaphragm is automatically set.

When it is desired to return to automatic operation of the diaphragm, the operator need only turn the lever 17 in a direction opposite to that indicated by the arrow A of FIG. 2, so that the spring 19 will now return the manually operable means to the position shown in FIG. 3 where it is uncoupled from the rotary means, and of course at this time the spring 26 will return the indicator 23 to the dot-dash line position shown in FIG. 2, so that the portion 24 of the lever 23 will no longer be visible in the viewing field, and the operator will therefore know that the exposure aperture is being automatically set. As soon as the lever 17 reaches the dot-dash line position shown in FIG. 2, the spring 19 expands to shift the flange 15 into engagement with the lever 17 while receiving the projections 18 in the cutouts 16. This forward movement of the manually operable means results in movement of the disc 29 away from the knife edge 13 so that the rotary means is now uncoupled from the manually operable means, and the automatic means 8, 9 will now operate to set the exposure aperture automatically.

It will be understood that each of the elements described above or two or more together, may also find a useful application in other types of cameras differing from the types described above.

While the invention has been illustrated and described as embodied in manually or automatically operable cameras, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a camera, in combination, support means; rotary means carried by said support means for changing the size of the exposure aperture during turning of said rotary means; automatic means cooperating with said rotary means for turning the latter in response to changes in lighting conditions for automatically setting the exposure aperture; manually operable means carried by said support means for movement between a coupled position where said manually operable means is coupled to said rotary means for manually turning the latter and setting the exposure aperture and an uncoupled position where said manually operable means is spaced from said rotary means so that said automatic means may then act on said rotary means to set the exposure aperture automatically; and releasable retaining means operable independently from said manually operable means and cooperating with said manually operable means for releasably retaining the latter in said coupled position thereof irrespective of the angular position of said manually operable means and rotary means, so that said manually operable means is coupled to said rotary means without rotational movement of said manually operable means and when said retaining means retains said manually operable means in said coupled position thereof said rotary means may be manually turned throughout the entire range of aperture sizes.

2. In a camera, in combination, support means; rotary means carried by said support means for changing the size of the exposure aperture during turning of said rotary means; automatic means cooperating with said rotary means for turning the latter in response to changes in lighting conditions for automatically setting the exposure aperture; manually operable means carried by said support means for movement between a coupled position where said manually operable means is coupled to said rotary means for manually turning the latter and setting the exposure aperture and an uncoupled position where said manually operable means is spaced from said rotary means so that said automatic means may then act on said rotary means to set the exposure aperture automatically; releasable retaining means cooperating with said manually operable means for releasably retaining the latter in said coupled position thereof irrespective of the angular position of said manually operable means and rotary means, so that when said retaining means retains said manually operable means in said coupled position thereof said rotary means may be manually turned throughout the entire range of aperture sizes, said releasable retaining means being carried by said support means for movement relative to said manually operable means between a retaining position where said releasable retaining means retains said manually operable means in said coupled position thereof without any corresponding movement of said manually movable means and a released position where said retaining means releases said manually operable means for movement from said coupled to said uncoupled position thereof; and holding means cooperating with said releasable retaining means for holding the latter in said retaining and said release positions thereof.

3. In a camera, in combination, support means; rotary means carried by said support means for changing the size of the exposure aperture during turning of said rotary means; automatic means cooperating with said rotary means for turning the latter in response to changes in lighting conditions for automatically setting the exposure aperture; manually operable means carried by said support means for movement between a coupled position where said manually operable means is coupled to said rotary means for manually turning the latter and setting the exposure aperture and an uncoupled position where said manually operable means is spaced from said rotary means so that said automatic means may then act on said rotary means to set the exposure aperture automatically; releasable retaining means cooperating with said manually operable means for releasably retaining the latter in said coupled position thereof irrespective of the angular position of said manually operable means and rotary means, so that when said retaining means retains said manually operable means in said coupled position thereof said rotary means may be manually turned throughout the entire range of aperture sizes, said releasable retaining means including a lever turnable between a release position releasing said manually operable means for movement between said coupled and uncoupled positions thereof and a retaining position retaining said manually operable means in said coupled position thereof; and spring means cooperating with said lever for releasably holding the latter in said release and said retaining positions thereof.

4. In a camera, in combination, support means; rotary means turnably carried by said support means for changing the size of the exposure aperture when said rotary means turns; automatic means cooperating with said rotary means for turning the same in response to changes in the lighting conditions; manually operable means carried by said support means for movement between a coupled position coupled to said rotary means for manually turning the latter so as to change the size of the exposure aperture manually and an uncoupled position spaced from said rotary means so that the latter may be turned by said automatic means for automatically setting the exposure aperture; releasable retaining means carried by said support means for movement relative to said manually operable means and cooperating with said manually operable means for releasably retaining the latter in said coupled position thereof irrespective of the angular position of said rotary means so that said manually operable means may be manipulated to turn said rotary means throughout the entire range of aperture sizes, said releasable retaining means being releasable for releasing said manually operable means for movement from said coupled to said uncoupled position thereof; view finder means carried by said support means and having a viewing field; and indicator means carried by said support means and cooperating with said releasable retaining means for indicating in the viewing field of said view finder means whether said releasable retaining means has coupled or uncoupled said manually operable means to said rotary means.

5. In a camera, in combination, support means; rotary means turnably carried by said support means for changing the size of the exposure aperture when said rotary means turns; automatic means cooperating with said rotary means for turning the same in response to changes in the lighting conditions; manually operable means carried by said support means for movement between a coupled position coupled to said rotary means for manually turning the latter so as to change the size of the exposure aperture manually and an uncoupled position spaced from said rotary means so that the latter may be turned by said automatic means for automatically setting the exposure aperture; releasable retaining means carried by said support means for movement relative to said manually operable means and cooperating with said manually operable means for releasably retaining the latter in said coupled position thereof irrespective of the angular position of said rotary means so that said manually operable means may be manipulated to turn said rotary means throughout the entire range of aperture sizes, said releasable retaining means being releasable for releasing said manually operable means for movement from said coupled to said uncoupled position thereof; viewfinder means carried by said support means and having a viewing field; and indicator means carried by said support means and visible in the viewing field of said viewfinder means for indicating to the operator when said manually operable means is coupled with said rotary means, said indicator means being in the form of a lever turnably carried by said support means and cooperating with said releasable retaining means to be turned thereby to a position where part of said lever is visible in said viewing field only when said releasable retaining means retains said manually operable means in said coupled position thereof.

6. In a camera, in combination, support means; rotary means carried by said support means for changing the size of the exposure aperture during turning of said rotary means; automatic means cooperating with said rotary means for turning the latter in response to changes in lighting conditions for automatically setting the exposure aperture; manually operable means carried by said support means for movement between a coupled position where said manually operable means is coupled to said rotary means for manually turning the latter and setting the exposure aperture and an uncoupled position where said manually operable means is spaced from said rotary means so that said automatic means may then act on said rotary means to set the exposure aperture automatically; and releasable retaining means cooperating with said manually operable means for releasably retaining the latter in said coupled position thereof irrespective of the angular position of said manually operable means and rotary means, so that when said retaining means retains said manually operable means in said coupled position thereof said rotary means may be manually turned throughout the entire range of aperture sizes, said releasable retaining means including a lever turnably carried by said support means for movement between two angular positions where said manually operable means is in said coupled and uncoupled positions thereof, respectively; viewfinder means carried by said support means and having a viewing field; a projection carried by said lever for turning movement therewith; an indicator lever; and spring means cooperating with said indicator lever for yieldably maintaining a porton thereof in engagement with said projection of said lever of said retaining means, said latter lever when turning to the position which places said manually operable means in said coupled position thereof acting through said projection on said indicator lever to turn the latter in opposition to said spring means to an indicating position where a portion of said indicator lever is visible in the viewing field of said viewfinder means, said spring means turning said indicator lever to a position where no part of said indicator lever is visible in the viewing field when said lever of said retaining means is turned to the position where said retaining means releases said manually operable means for movement to said uncoupled position thereof.

7. In a camera, in combination, rotary means turnable about a predetermined axis for changing the size of the exposure aperture of the camera; a sleeve having an axis coinciding with the turning axis of said rotary means; support means supporting said sleeve for axial movement toward and away from said rotary means but restraining said sleeve against rotary movement; a shaft turnable in said sleeve; means preventing said shaft from shifting axially with respect to said sleeve while freeing said shaft for rotary movement with respect to said sleeve; coupling means for coupling said shaft to said rotary means when said sleeve is axially moved from a rest position toward said rotary means; manually-engagable means cooperating with said sleeve for shifting the latter and said shaft axially toward said rotary means where said coupling means couples said shaft to said rotary means so that the latter may be turned upon manual turning of said shaft for manually setting the exposure aperture; and releasable retaining means cooperating with said sleeve for releasably retaining the latter in the position where said coupling means couples said shaft to said rotary means, so that said shaft may be turned through the entire range of exposure aperture sizes while said sleeve is retained in the axial position where said shaft is coupled with said rotary means, whereby said sleeve maintains said coupled relationship between said shaft and said rotary means.

8. In a camera, in combination, rotary means turnable about a predetermined axis for changing the size of the exposure aperture of the camera; a sleeve having an axis coinciding with the turning axis of said rotary means; support means supporting said sleeve for axial movement toward and away from said rotary means but restraining said sleeve against rotary movement; a shaft turnable in said sleeve; means preventing said shaft from shifting axially with respect to said sleeve while freeing said shaft for rotary movement with respect to said sleeve; coupling means for coupling said shaft to said rotary means when said sleeve is axially moved from a rest position toward said rotary means; manually-engageable means cooperating with said sleeve for shifting the latter and said shaft axially toward said rotary means where said coupling means couples said shaft to said rotary means so that the latter may be turned upon manual turning of said shaft for manually setting the exposure aperture; and releasable retaining means cooperating with said sleeve for releasably retaining the latter in the position where said coupling means couples said shaft to said rotary means, so that said shaft may be turned through the entire range of exposure aperture sizes while said sleeve is retained in the axial position where said shaft is coupled with said rotary means, said releasable retaining means including a lever turnable about said sleeve and having a projection and a flange fixed to said sleeve, located next to said lever, and formed with a cutout in which said projection is located when said sleeve is in said rest position where said shaft is not coupled to said rotary means, said lever being turnable for moving said projection out of said cutout and thereby displacing said sleeve axially toward said rotary means so that said coupling means will couple said shaft to said rotary means while said projection and said lever retains said sleeve in the axial position where said shaft is coupled with said rotary means.

9. In a camera, in combination, rotary means turnable about a predetermined axis for changing the size of the exposure aperture of the camera; a sleeve having an axis coinciding with the turning axis of said rotary means; support means supporting said sleeve for axial movement toward and away from said rotary means but restraining said sleeve against rotary movement; a shaft turnable in said sleeve; means preventing said shaft from shifting axially with respect to said sleeve while freeing said shaft for rotary movement with respect to said sleeve; coupling means for coupling said shaft to said rotary means when said sleeve is axially moved from a rest position toward said rotary means; manually-engageable means cooperating with said sleeve for shifting the latter and said shaft axially toward said rotary means where said coupling means couples said shaft to said rotary means so that the latter may be turned upon manual turning of said shaft for manually setting the exposure aperture; releasable retaining means cooperating with said sleeve for releasably retaining the latter in the position where said coupling means couples said shaft to said rotary means, so that said shaft may be turned through the entire range of exposure aperture sizes while said sleeve is retained in the axial position where said shaft is coupled with said rotary means; and spring means urging said sleeve to said rest position where said shaft is uncoupled from said rotary means, whereby said sleeve maintains said coupled relationship between said shaft and said rotary means.

10. In a camera, in combination, rotary means turnable about a predetermined axis for changing the size of the exposure aperture of the camera; a sleeve having an axis coinciding with the turning axis of said rotary means; support means supporting said sleeve for axial movement toward and away from said rotary means but restraining said sleeve against rotary movement; a shaft turnable in said sleeve; means preventing said shaft from shifting axially with respect to said sleeve while freeing said shaft for rotary movement with respect to said sleeve; coupling means for coupling said shaft to said rotary means when said sleeve is axially moved from a rest position toward said rotary means; manually-engageable means cooperating with said sleeve for shifting the latter and said shaft axially toward said rotary means where said coupling means couples said shaft to said rotary means so that the latter may be turned upon manual turning of said shaft for manually setting the exposure aperture; releasable retaining means cooperating with said sleeve for releasably retaining the latter in the position where said coupling means couples said shaft to said rotary means, so that said shaft may be turned through the entire range of exposure aperture sizes while said sleeve is retained in the axial position where said shaft is coupled with said rotary means, said releasable retaining means including a lever turnable about said sleeve and having a projection and a flange fixed to said sleeve, located next to said lever, and formed with a cutout in which said projection is located when said sleeve is in said rest position where said shaft is not coupled to said rotary means, said lever being turnable for moving said projection out of said cutout and thereby displacing said sleeve axially toward said rotary means so that said coupling means will couple said shaft to said rotary means while said projection and said lever retains said sleeve in the axial position where said shaft is coupled with said rotary means; and spring means cooperating with said sleeve for urging the latter toward said rest position thereof and for releasably retaining said sleeve in a position where said projection is located in said cutout.

11. In a camera, in combination, rotary means turnable about a predetermined axis for changing the size of the exposure aperture of the camera; a sleeve having an axis coinciding with the turning axis of said rotary means; support means supporting said sleeve for axial movement toward and away from said rotary means but restraining said sleeve against rotary movement; a shaft turnable in said sleeve; means preventing said shaft from shifting axially with respect to said sleeve while freeing said shaft for rotary movement with respect to said sleeve; coupling means for coupling said shaft to said rotary means when said sleeve is axially moved from a rest position toward said rotary means; manually-engageable means cooperating with said sleeve for shifting the latter and said shaft axially toward said rotary means where said coupling means couples said shaft to said rotary means so that the latter may be turned upon manual turning of said shaft for manually setting the exposure aperture; and releasable retaining means cooperating with said sleeve for releasably retaining the latter in the position where said coupling means couples said shaft to said rotary means, so that said shaft may be turned through the entire range of exposure aperture sizes while said sleeve is retained in the axial position where said shaft is coupled with said rotary means, said releasable retaining means including a lever turnable about said sleeve and having a projection and a flange fixed to said sleeve, located next to said lever, and formed with a cutout in which said projection is located when said sleeve is in said rest position where said shaft is not coupled to said rotary means, said lever being turnable for moving said projection out of said cutout and thereby displacing said sleeve axially toward said rotary means so that said coupling means will couple said shaft to said rotary means while said projection and said lever retains said sleeve in the axial position where said shaft is coupled with said rotary means, said coupling means being fixed to an end of said shaft which is nearest to said rotary means and said manually engageable means being in the form of a knob fixed to an opposite end of said shaft, said coupling means and said knob respectively having portions which cooperate with said shaft to prevent axial movement thereof with respect to said sleeve.

12. In a camera, in combination, an electrical instrument having a rotor which turns about a predetermined axis to angular positions determined by the lighting conditions; a pointer fixed to said rotor for turning movement therewith; a viewfinder window carrying a scale with which said pointer cooperates so that the position of said pointer with respect to said scale is seen while looking at the subject to be photographed; diaphragm setting means connected to said rotor for turning movement therewith for setting the exposure aperture according to the angular position of said rotor; a sleeve coaxial with said rotor; means supporting said sleeve only for axial movement toward and away from said rotor; spring means cooperating with said sleeve for holding the same in a rest position spaced from said rotor, said spring means urging said sleeve away from said rotor; a shaft turnable in said sleeve; coupling means cooperating with said rotor and shaft for coupling the latter to said rotor when said sleeve is moved in opposition to said spring means toward said rotor; a manually-engageable knob fixed to said shaft at a part thereof distant from said coupling means so that said knob may be engaged for shifting said sleeve and said shaft therewith in opposition to said spring means towards said rotor to couple the shaft to the rotor, said pointer cooperating with said scale to indicate the size of the exposure aperture during manual as well as automatic setting of the exposure aperture; and releasable retaining means cooperating with said sleeve for releasably retaining the latter in opposition to said spring means in a position where said coupling means couples said shaft to said rotor irrespective of the angular position of said shaft so that the latter may be manually turned with respect to the sleeve to adjust the diaphragm throughout its entire range of aperture sizes.

13. In a camera, in combination, a front camera wall and an intermediate camera wall respectively formed with aligned openings located along a predetermined axis; an elongated sleeve extending through said openings and supported by said walls for axial movement, said sleeve having an axis coinciding with said openings and said sleeve having between said walls an outwardly directed annular flange; means carried by one of said walls and cooperating with said sleeve for preventing rotary movement thereof so that said sleeve is constrained to move only axially; a coil spring surrounding said sleeve between said intermediate wall and flange for urging the latter toward said front wall, said flange being formed with at least one cutout; a lever turnably carried by said sleeve between said flange and front wall and having a projection located in said cutout in one angular position of said lever, said lever being turnable to a second angular position where said projection moves out of said cutout and displaces said sleeve in opposition to said spring away from said front wall; an electrical instrument having a rotor turnable to angular positions determined by the lighting conditions, said rotor being coaxial with said sleeve and located on the side of said intermediate wall opposite from said front wall; a shaft turnable in said sleeve and having an end directed toward said rotor; coupling means operatively connected with said rotor and said end of said shaft for coupling the latter to said rotor when said lever is turned to said second angular position; a knob carried by said shaft at the exterior of the camera so that said shaft may be manually turned when coupled to said rotor for manually turning the latter; and diaphragm-setting means operatively connected with said rotor for changing the size of the exposure aperture in response to turning of said rotor, whereby when said shaft is uncoupled from said rotor the latter may automatically set the diaphragm while when said shaft is coupled to said rotor said rotor may be manually turned for manually setting the diaphragm.

14. In a camera, in combination, an electrical instrument having a rotor turnable to different angular positions determined by the lighting conditions; a pointer connected to said rotor for turning movement therewith and having a free end portion spaced from said rotor; a motion transmitting member carried by said free end portion of said pointer; a shaft movable toward and away from said rotor and being coaxial therewith; a second motion transmitting member carried by said shaft and cooperating with said first-mentioned motion transmitting member when said shaft is displaced axially toward said rotor for turning the latter with said shaft so that when said shaft is manually turned the rotor will be manually turned; diaphragm-setting means operatively connected to said rotor for turning movement therewith; and releasable retaining means movable relative to and cooperating with said shaft for releasably retaining the latter in the position where said motion transmitting members transmit turning of said shaft to said rotor irrespective of the angular position of said shaft, so that said shaft may be coupled to said rotor without rotational movement of said and when said retaining means retains said shaft in said coupled position thereof said rotor may be manually turned throughout the entire range of aperture sizes.

References Cited in the file of this patent

UNITED STATES PATENTS

| | | |
|---|---|---|
| 2,194,152 | Riszdorfer | Mar. 19, 1940 |
| 2,360,256 | Mihalyi | Oct. 10, 1944 |
| 2,841,064 | Bagby et al. | July 1, 1958 |
| 2,923,170 | Pfaffenberger | Feb. 2, 1960 |
| 2,981,165 | Estes | Apr. 25, 1961 |
| 2,991,704 | Pickens | July 11, 1961 |